S. L. DAVIS.
LOCATING INSTRUMENT.
APPLICATION FILED OCT. 25, 1913.
1,119,779.
Patented Dec. 1, 1914.
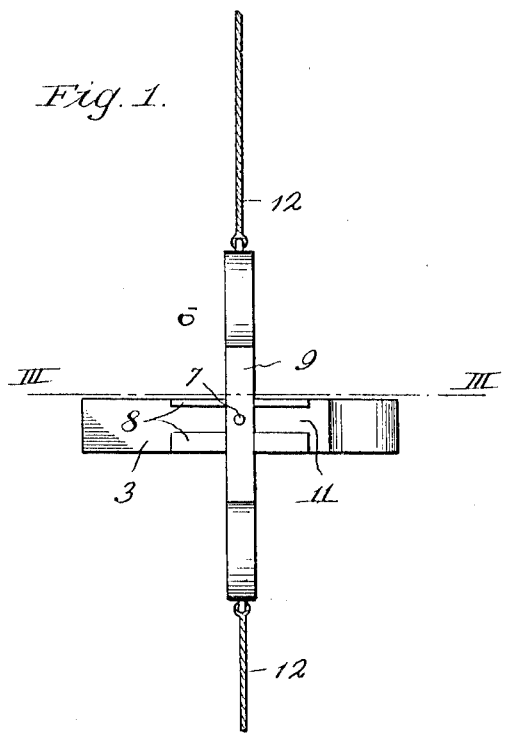
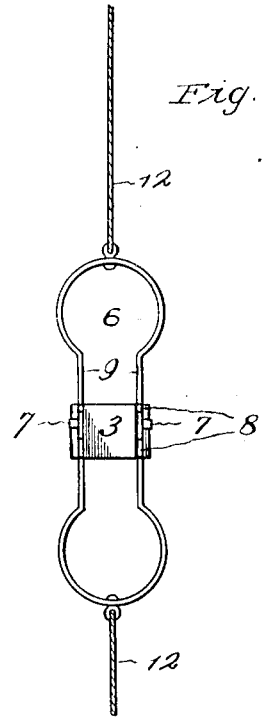
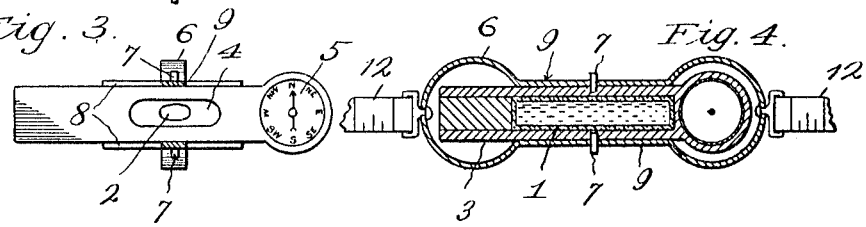
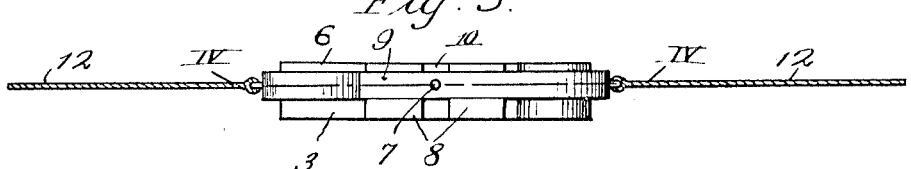
WITNESSES:
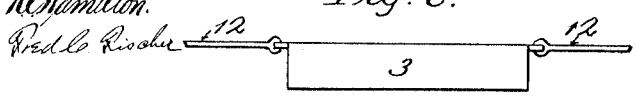
INVENTOR:
Stephen L. Davis,
BY
F. G. Fischer
ATTORNEY.

UNITED STATES PATENT OFFICE.

STEPHEN L. DAVIS, OF KANSAS CITY, MISSOURI.

LOCATING INSTRUMENT.

1,119,779.  Specification of Letters Patent.  Patented Dec. 1, 1914.

Application filed October 25, 1913. Serial No. 797,237.

*To all whom it may concern:*

Be it known that I, STEPHEN L. DAVIS, a citizen of the United States, residing at Kansas City, in the county of Jackson and State of Missouri, have invented certain new and useful Improvements in Locating Instruments, of which the following is a specification.

My invention relates to improvements in locating instruments, and my principal object is to provide a simple, inexpensive instrument of this character, whereby horizontal and vertical planes may be quickly and accurately determined, and whereby the points of the compass can be readily ascertained.

In order that the invention may be fully understood, reference will now be made to the accompanying drawing, in which:

Figure 1 is a side elevation of the instrument adjusted to determine a vertical plane. Fig. 2 is an end view of the instrument. Fig. 3 is a horizontal section on line III—III of Fig. 1. Fig. 4 is a horizontal section on line IV—IV of Fig. 5. Fig. 5 is a side elevation of the instrument adjusted to determine a horizontal plane, and Fig. 6 is a side elevation of a simplified form of the invention.

In carrying out the invention, I employ a leveling device consisting of a glass or other transparent tube 1, containing a liquid having an air bubble 2 therein, whereby it may be accurately determined when said glass tube occupies a true horizontal plane.

3 designates a protecting case of metal or other suitable material, inclosing the tube 1 and having a slot 4 in its upper portion to expose the air bubble 2 to view. One end of case 3 is of circular form to receive a compass 5. 6 designates a loop pivotally mounted upon a pair of trunnions 7 projecting from opposite sides of the case 3, at a point slightly above the center of gravity of the latter. Loop 6 is held either in a vertical or a horizontal position with relation to case 3, by two pairs of elongated lugs 8 on opposite sides of said case, said lugs being spaced apart to receive the parallel arms 9 of the loop when the same extend either in the vertical position disclosed by Fig. 1 or in the horizontal position disclosed by Fig. 5. The arms 9 are resilient, so that when sprung outward on the trunnions 7 to pass the projecting lugs 8, to allow the loop to be adjusted to vertical or horizontal position, said arms will immediately either enter the spaces 10 or the spaces 11 between said lugs on registering therewith. Hence, there will be no lost motion between loop 6 and the case 3 when said loop extends transversely to or horizontal with said case.

12 designates two cables which may be in the form of cords, chains, or wires, or in the form of tape-lines, as shown on Fig. 4, so that devices can be used for measuring as well as ascertaining different points of direction.

When the loop 5 is adjusted to a position parallel with case 3, as shown on Fig. 5, and a cord is employed, said case could be readily turned over by the twisting of the cord and thus bring its slot 4 downward instead of upward, so that the air bubble 2 could not be read, if it were not for the fact that the trunnions 7 are located slightly above the center of gravity of the case 3. By thus locating the trunnions 7, that portion of the case below is heavier than the portion above said trunnions, and consequently the case is prevented from turning over.

From the foregoing description, it will be apparent that I have produced a simple and inexpensive device which may be employed to advantage by all classes of mechanics who have occasion to determine vertical and horizontal planes and the various points of the compass, and can be used in laying out foundations, drives, walks, and in building walls, etc.

Having thus described my invention, what I claim and desire to secure by Letters Patent is:

1. An instrument of the character described, consisting of a leveling device, a loop pivotally connected to said leveling device and adapted to be adjusted either into alinement with or transversely to said device, and lines attached to the ends of said loop.

2. An instrument of the character described, consisting of a leveling device, a loop pivotally connected to said leveling device and adapted to be adjusted either into alinement with or transversely to said device, and means on the leveling device to secure said loop in any of its adjusted positions.

In testimony whereof I affix my signature, in the presence of two witnesses.

STEPHEN L. DAVIS.

Witnesses:
F. G. FISCHER,
L. J. FISCHER.

Copies of this patent may be obtained for five cents each, by addressing the "Commissioner of Patents, Washington, D. C."